(12) United States Patent
Zaharia (10) Patent No.: US 11,718,270 B2
(45) Date of Patent: *Aug. 8, 2023

(54) VEHICLE SIDE VIEW CAMERA SYSTEM WITH ADJUSTABLE FIELD OF VIEW (71) Applicant: FotoNation Limited, Galway (IE)

(72) Inventor: Corneliu Zaharia, Brasov (RO)

(73) Assignee: FotoNation Limited ( * ) Notice: Subject to any disclaimer, the term of this patent is extended or adjusted under 35 U.S.C. 154(b) by 109 days.

This patent is subject to a terminal disclaimer.

(21) Appl. No.: 17/098,697

(22) Filed: Nov. 16, 2020

(65) Prior Publication Data
US 2021/0129797 A1 May 6, 2021

Related U.S. Application Data (63) Continuation of application No. 16/225,724, filed on Dec. 19, 2018, now Pat. No. 10,836,353.

(60) Provisional application No. 62/768,014, filed on Nov. 15, 2018.

(51) Int. Cl.
B60R 25/30 (2013.01)
B60R 1/12 (2006.01)
(Continued)

(52) U.S. Cl.
CPC .............. *B60R 25/305* (2013.01); *B60R 1/07* (2013.01); *B60R 1/12* (2013.01); *B60R 25/102* (2013.01); *B60R 25/104* (2013.01); *B60R 25/1004* (2013.01); *B60R 25/20* (2013.01); *B60R 25/302* (2013.01); *G06T 7/136* (2017.01);
(Continued)

(58) Field of Classification Search
None
See application file for complete search history.

(56) References Cited

U.S. PATENT DOCUMENTS 6,291,906 B1 * 9/2001 Marcus ............... B60C 23/0408
359/603
9,129,495 B1 * 9/2015 Stewart ............ G08B 13/19647
(Continued)

FOREIGN PATENT DOCUMENTS

| KR | 20120058208 A | 6/2012 |
| KR | 101719803 | 3/2017 |
| KR | 101760050 B1 | 7/2017 |

OTHER PUBLICATIONS

Office Action for U.S. Appl. No. 16/225,724, dated Feb. 10, 2020, Zaharia, "Vehicle Side View Camera System With Adjustable Field of View", 29 pages.

*Primary Examiner* — Tyler W. Sullivan
(74) *Attorney, Agent, or Firm* — Lerner David LLP (57) ABSTRACT A vehicle can include one or more movably mounted cameras that are able to move to adjust a viewing angle of the camera(s) relative to a body of the vehicle. The camera(s) may be movable by virtue of being coupled to a movable side mirror, such that movement of the side mirror changes a field of view of the camera coupled to the side mirror. For example, the side mirror can be rotated about a rotational axis between a first position in which a field of view of the camera is directed in a first direction (e.g. toward a ground proximate the vehicle), and a second position in which the field of view of the camera is directed in a second direction, different than the first direction (e.g., outward from the vehicle or toward a door of the vehicle).

20 Claims, 8 Drawing Sheets (51) Int. Cl.
  *B60R 25/20* (2013.01)
  *B60R 25/102* (2013.01)
  *B60R 25/104* (2013.01)
  *B60R 25/10* (2013.01)
  *G06T 7/136* (2017.01)
  *B60R 1/07* (2006.01)

(52) U.S. Cl.
  CPC .............. *B60R 2001/1223* (2013.01); *B60R 2001/1253* (2013.01); *B60R 2025/1013* (2013.01); *B60R 2025/1016* (2013.01); *B60R 2300/101* (2013.01)

(56) References Cited

U.S. PATENT DOCUMENTS

| | | | |
|---|---|---|---|
| 9,704,376 B2 | 7/2017 | Eyring et al. | |
| 10,126,422 B1 | 11/2018 | Obodo | |
| 10,421,401 B1 | 9/2019 | Horian | |
| 10,836,353 B2 * | 11/2020 | Zaharia | B60R 1/00 |
| 2002/0097145 A1 | 7/2002 | Tumey et al. | |
| 2009/0040306 A1 | 2/2009 | Foote et al. | |
| 2010/0060441 A1 | 3/2010 | Iwamoto | |
| 2011/0273527 A1 | 11/2011 | Liu | |
| 2015/0169968 A1 | 6/2015 | Michmerhuizen et al. | |
| 2015/0353011 A1 | 12/2015 | Baek et al. | |
| 2017/0045890 A1 | 2/2017 | Gurin | |
| 2017/0210282 A1 | 7/2017 | Rodriguez Barros | |
| 2017/0341611 A1 | 11/2017 | Baker et al. | |
| 2018/0111480 A1 | 4/2018 | Machak et al. | |
| 2018/0290594 A1 | 10/2018 | Abdel-Rahman et al. | |
| 2018/0339656 A1 * | 11/2018 | Alarcon | B60Q 9/008 |
| 2020/0031278 A1 | 1/2020 | Zafeirakis | |
| 2020/0156592 A1 | 5/2020 | Zaharia | |
| 2020/0189455 A1 | 6/2020 | Berreur et al. | |
| 2021/0129753 A1 * | 5/2021 | Hendricks | B60R 1/025 |

* cited by examiner

VEHICLE SIDE VIEW CAMERA SYSTEM WITH ADJUSTABLE FIELD OF VIEW

This application is a continuation of U.S. application Ser. No. 16/225,724 filed Dec. 19, 2018 which application claims the benefit of priority to U.S. Provisional Application No. 62/768,014, filed Nov. 15, 2018, the disclosures of which are incorporated herein by reference in their entirety.

BACKGROUND

Vehicle manufacturers and vehicle owners have begun to implement camera technology in a variety of different applications. Often, cameras are used on vehicles to increase driver awareness, environmental visibility, and/or to assist drivers in the manner in which they operate a vehicle. For example, cameras may be used on various locations of a car to give a driver increased visibility of the environment surrounding the vehicle (e.g., backup cameras, 360-degree view cameras, etc.). Some cameras used in such examples assist the driver to see the environment around the vehicle while parking, or in congested areas. Other cameras may be used to assist a driver to maintain lane position and/or warn the driver when the driver has lost focus.

However, cameras used on vehicles are typically designed for a specific purpose and are fixedly mounted to the vehicle at a location for the specific purpose (e.g., a backup camera on a rear lift gate or bumper of a vehicle). As such, these cameras have limited functionality and lack the adaptability to perform multiple different functions.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the components on a larger scale or differently shaped for the sake of clarity.

DETAILED DESCRIPTION

Overview

As described previously, vehicle cameras are used in a variety of different applications, often to increase the safety of the vehicle, its occupants, and anyone who may be surrounding the vehicle. Typically, these cameras are fixedly mounted on and/or in the vehicle to focus on a single view of the environment within and/or without the vehicle (e.g., a backup camera on a rear lift gate or bumper of a vehicle). This application describes a vehicle including one or more movably mounted cameras that are able to move to adjust a viewing angle of the camera(s) relative to a body of the vehicle. In some examples, a movable side mirror may include one or more cameras coupled thereto. The side mirror may be configured to rotate and/or translate relative to a body of a vehicle to which it is mounted. The camera may be fixedly mounted to a housing or other surface of the side mirror such that movement of the side mirror changes a field of view of the camera coupled to the side mirror. Additionally or alternatively, the camera may be movably mounted to the housing or other surface of the side mirror such that the camera field of view may be changed by movement of the camera independent of movement of the side mirror relative to the vehicle. By enabling a field of view of one or more cameras of the vehicle, the cameras may be used to perform multiple functions, thereby reducing the number of cameras needed to perform the multiple functions. For instance, in one example a side mirror including a camera that may be used in a first position to increase operational safety of the vehicle (e.g., to provide visibility around a periphery of the vehicle during driving or parking) and a second position to increase vehicle security (e.g., to capture images of people or objects approaching the vehicle).

In an embodiment, the side mirror may be attached to a body of a vehicle and may be disposed in a first position (e.g., a deployed position or extended position)). In the first position, the side mirror may extend laterally outward from the vehicle such that a length ("L") of the side mirror is substantially parallel to a surface on which the vehicle resides and/or is conveyed and is substantially perpendicular to a length of the vehicle. In an embodiment, the side mirror may be disposed in the first position when, for example, the vehicle is moving, the vehicle is occupied, the doors of the vehicle are unlocked, etc. In the first position, the camera may be disposed on a bottom or downward facing surface of the side mirror such that an optical axis of the camera is directed at a first angle, (e.g., an angle below a horizon). For example, in the first position a field of view of the camera may be disposed substantially downward so as to give a driver of the vehicle a view of the ground (or other hard to see areas) surrounding the vehicle as the driver operates the vehicle. In such an example, the camera view may be displayed on, for example, a display in a cabin of the vehicle.

Furthermore, the side mirror may be moved to a second position (e.g., a stowed or folded position). In the second position, the side mirror may be positioned such that a length of the side mirror extends substantially parallel to at least a portion of a driver side window or door of the vehicle. In an embodiment, the side mirror may be disposed in the second position when, for example, the vehicle is parked, the vehicle is stationary, the vehicle is unoccupied, the doors are locked, the vehicle senses an object(s) nearby (described further herein below), upon a user of the vehicle instructing the vehicle to move the side mirror into the second position, etc. In the second position, the camera may be oriented such that an optical axis of the camera is directed at a second angle (e.g., at or above the horizon). By moving the side mirror from the first position to the second position, the field of view of the camera may be adjusted to capture a different area. For instance, the field of view may be changed from capturing a road surface around a periphery of the vehicle (in the first position) to capturing a portion of an environment surrounding the vehicle from which people or objects may approach the vehicle (in the second position). In such an embodiment, in the second position the camera may be used for security and/or other purposes (described further herein below). For example, the camera may be used to identify an authorized user of the vehicle, to detect potential theft or vandalism, or the like. In one specific example, an authorized user of the vehicle can be identified by processing image data captured by the camera, and the doors of the vehicle may be unlocked to allow the authorized user to access the vehicle.

As discussed above, in some examples, the side mirror may include a mirror housing. The mirror housing may be shaped to accommodate a mirror therein. In an embodiment, the camera described above may be disposed on the mirror housing of the side mirror. For example, the camera may be disposed on a bottom or downward facing surface of the mirror housing. However, in other embodiments, the camera may be disposed on a reflective surface of the mirror, on another surface of the mirror housing, or another portion of the side mirror.

In some examples, the side mirror may also include an attachment arm. The attachment arm may include a first end that is continuous with the mirror housing. However, in another embodiment, a first end of the attachment arm may be separate from and attached to the mirror housing. The attachment arm may also include a second end that is configured to attach the mirror housing to the vehicle. The attachment arm may further include a hinge coupling the first end to the second end, the hinge having a rotational axis about which the mirror housing is rotatable.

In some examples, the side mirror may include a motor to move the side mirror between the extended position to the folded position, and any intermediate position therebetween. The motor may be coupled to at least one of the mirror housing, the attachment arm, or the hinge and may be configured to rotate the mirror housing about the rotational axis of the hinge between the extended position and the folded position. In an embodiment, the motor may be communicatively coupled to a controller. The controller may activate the motor to move the side mirror between the first position and the second position. The controller may automatically move the side mirror based on one or more events described further herein below.

In an embodiment, one or more computer vision algorithms may be executed, either locally by a computing device of the vehicle or remotely by a network connected computing device, on the image data captured from the camera. The computer vision algorithms may be used to identify authorized users of the vehicle, determine when objects are within a threshold distance of the vehicle, determine when an unauthorized user is trying to gain access to the vehicle, etc. The vehicle may take action depending on the determination of the computer vision algorithm. For example, the vehicle may lock doors of the vehicle, unlock doors of the vehicle, open one or more doors of the vehicle, activate a security system of the vehicle, send a notification to an authorized user of the vehicle, etc.

Additional details of these and other examples are described below with reference to the drawings.

Example Illustration

Figure 1A:
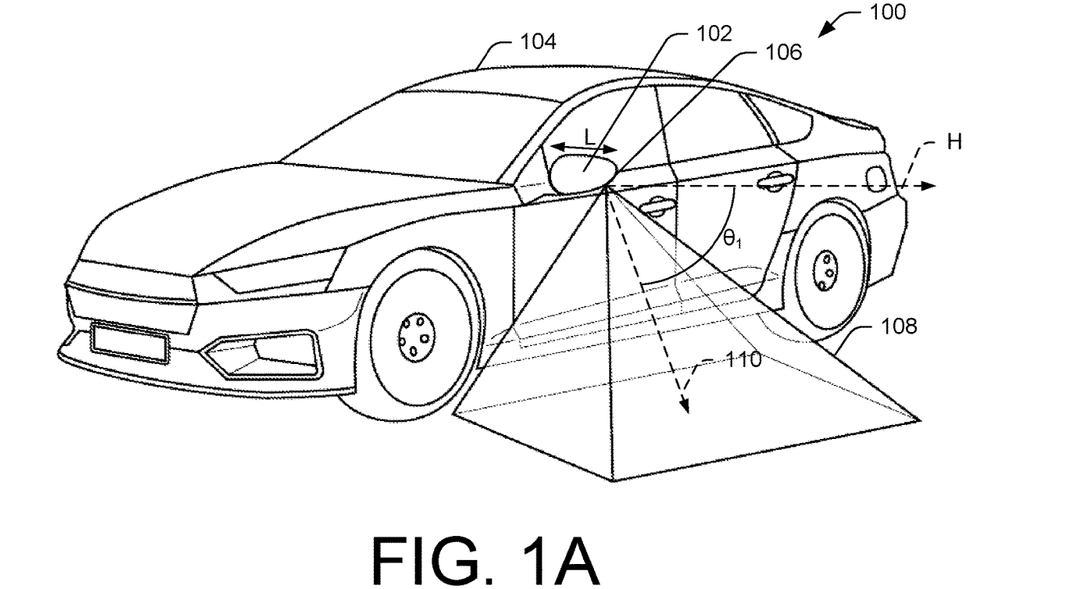
FIG. 1A illustrates a perspective view of an example vehicle having a side mirror oriented in a first position, the vehicle side mirror including a camera.

FIG. 1A depicts a perspective view of a first position 100 of a side mirror 102 of a vehicle 104 oriented in a first position, the side mirror including a camera 106. As described previously, the first position 100 of the side mirror 102 may include an extended position of the side mirror 102. In such a position, the side mirror 102 is positioned to aid the driver to see areas behind and to the side of the vehicle 104, which may be outside the driver's peripheral vision. In an embodiment, the camera 106 may be disposed on a bottom surface of the side mirror 102 such that the field of view 108 of the camera 106 is directed substantially downward. The field of view 108 lines depict a possible viewing field of the camera 106. It should be noted that the field of view lines are merely shown as an example field of view. The actual field of view may depend on the type, design, and/or orientation of a particular camera. For example, in the first position 100, an optical axis 110 of the camera 106 may be directed at an angle ($\theta_1$) below a horizon (as shown by line H). In an embodiment, the camera 106 may be fixed against movement relative to the side mirror 102. However, in another embodiment, the side mirror 102 may include one or more actuators (not shown) to pan or tilt the camera 106 relative to the side mirror 102.

As described previously, the side mirror 102 may be disposed in the first position 100 while a driver may need to use the side mirror 102. For example, the side mirror 102 may be in the first position 100 while the driver is in the vehicle, the vehicle is moving, the vehicle is occupied etc. In an embodiment, image data captured by the camera 106 of the side mirror 102 may be displayed on one or more displays inside the vehicle 104, thus allowing a driver to have increased visibility into an environment surrounding the vehicle 104.

Figure 1B:
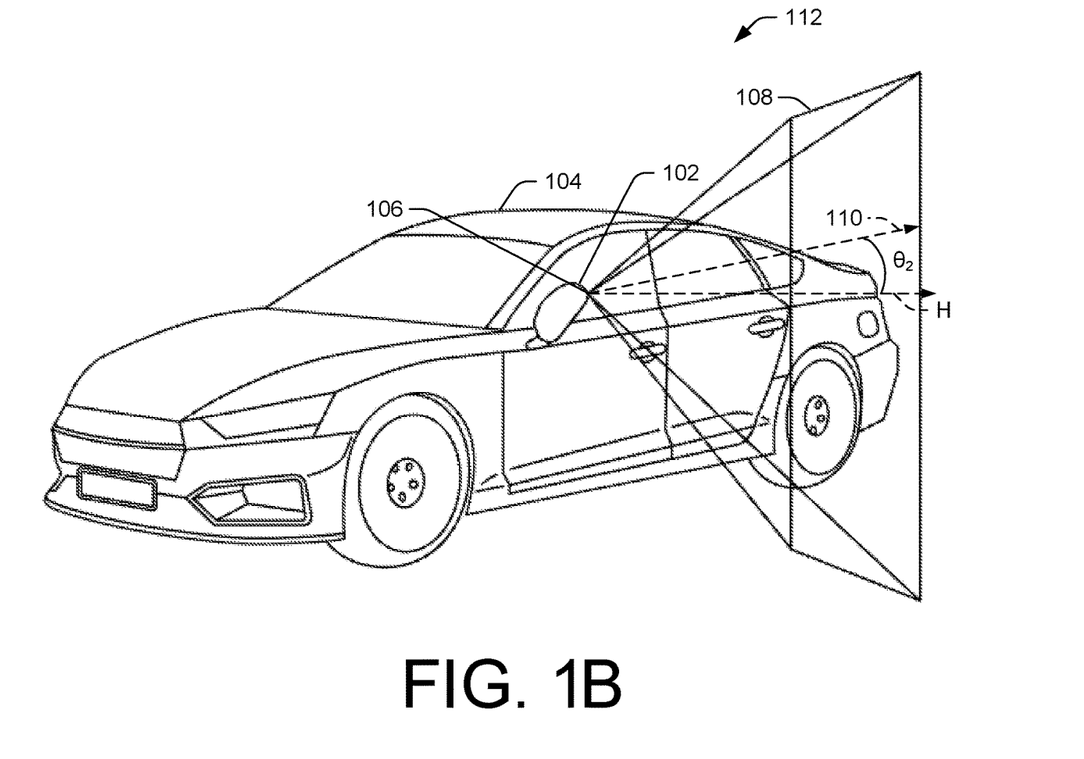
FIG. 1B illustrates a perspective view of the example vehicle having the side mirror oriented in a second position.

FIG. 1B depicts a perspective view of a second position 112 of the side mirror 102 of the vehicle 104. As described previously, the second position 112 of the side mirror 102 may include a folded position of the side mirror 102. In an embodiment, the second position 112 of the side mirror 102 directs an optical axis 110 of the camera 106 at an angle ($\theta_2$) at or above the horizon (H). In such an embodiment, the field of view 108 of the camera 106 may be directed substantially outward from the vehicle 104 such that the camera 106 captures image data of an environment surrounding the vehicle, people or objects approaching the vehicle, etc. In the second position 112, the camera 106 may still capture image data that may include a portion(s) of the vehicle 104. For example, in the second position, the field of view 108 may capture an area near a door handle of the vehicle 104 so as to capture images of an area that a person may approach when attempting to get into the vehicle 104. In an embodiment, the side mirror 102 may be moved into the second position 112 when the side mirror 102 is not needed by a driver of the vehicle 104. For example, the side mirror 102 may be moved into the second position 112 when the vehicle 104 is parked, the vehicle is unoccupied, the vehicle is stationary, etc. Such movement may include, but is not limited to: rotation, folding, sliding, etc. In an embodiment, the side mirror 102 may move from the first position 100 to the second position 112 in response to any one of the previously mentioned events. For example, while the vehicle 104 is occupied the side mirror 102 may be in the first position 100, then, upon the vehicle 104 being shifted into park, the side mirror 102 may move automatically into the second position 110. As mentioned previously, the side mirror 102 may be moved into the second position 112 in order to capture image data of an environment surrounding the vehicle 104.

Figure 2:
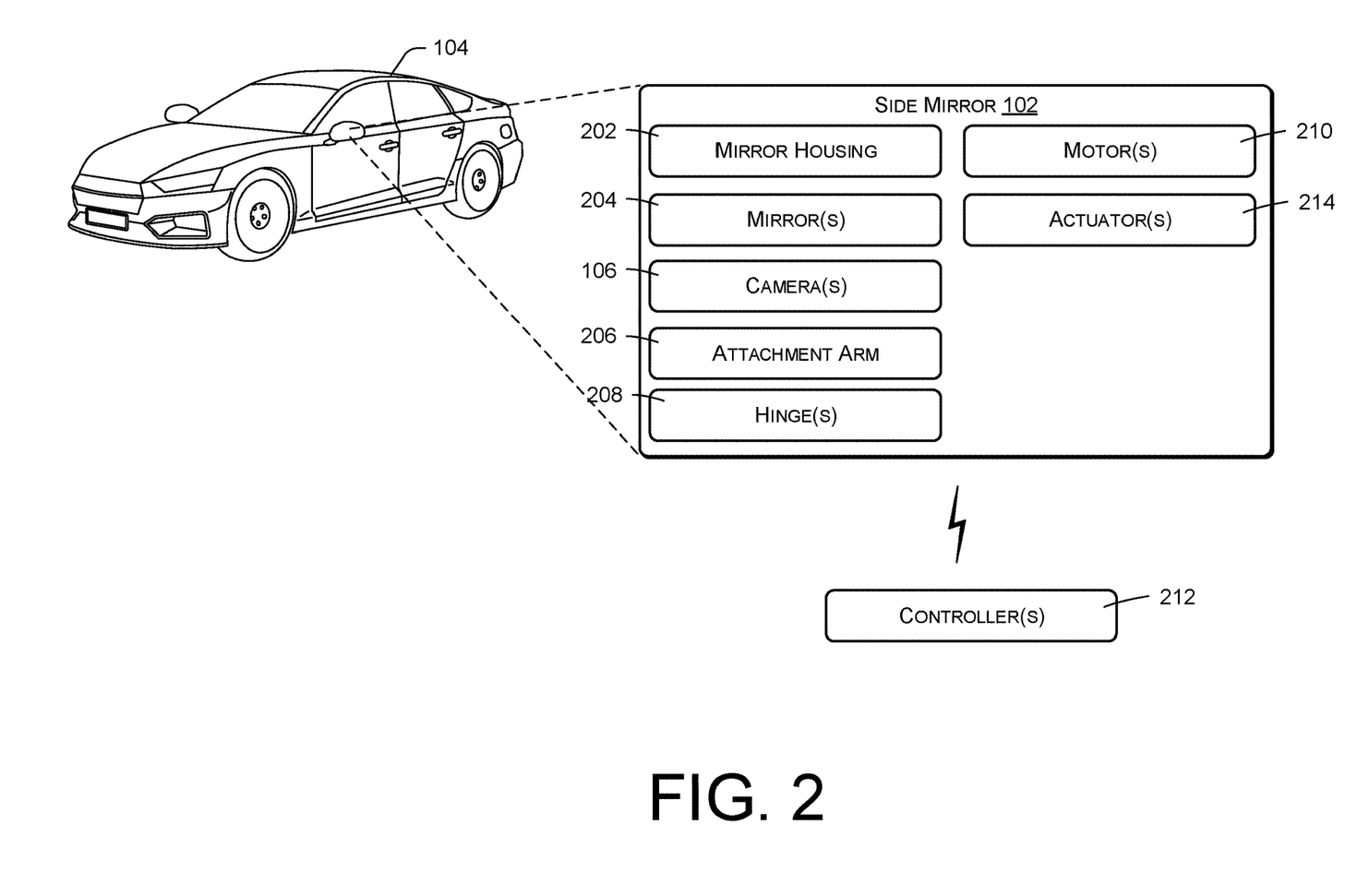
FIG. 2 is a block diagram illustrating components of an example side mirror, such as that shown in FIGS. 1A and 1B.

FIG. 2 depicts a block diagram illustrating components of the side mirror 102 described in FIGS. 1A and 1B. It should be noted, that while the description and figures describe a single side mirror shown on a driver side of the vehicle, a same or similar side mirror including similar components may be implemented on an opposite side of the vehicle 104. For example, the vehicle 104 may include two side mirrors, one on each side of vehicle, each having the same or similar components and/or function. The side mirror 102 may include mirror housing 202. The mirror housing 202 may be shaped to accommodate a mirror 204 therein. In an embodiment, the mirror housing 202 may be contiguous with the mirror 204. However, in an alternative embodiment, the mirror 204 may be disposed within the mirror housing such that the mirror 204 may move relative to the mirror housing 202. In an embodiment, the mirror housing 202 may contain any type of reflective surface.

As mentioned previously, the side mirror 102 may include a camera 106. In an embodiment, the side mirror 102 may include a plurality of cameras. The camera 106 captures image data of an environment surrounding the vehicle 104. In an embodiment, the camera 106 may be fixedly disposed on the side mirror 102 such that camera 106 does not move relative to the side mirror 102. Additionally, and/or alternatively, in an embodiment, the camera may be disposed to the side mirror such that the camera is able to move relative to the side mirror (described further herein below). In FIGS. 1A and 1B, the camera 106 is disposed on a bottom surface of the mirror housing 202. However, in an alternative embodiment, the camera 106 may be disposed on any surface of the mirror housing 202 or the mirror 204 itself. In still further embodiments, the camera 106 may be disposed on any portion of the side mirror 102 or the vehicle 104.

The side mirror 102 may include an attachment arm 206, in an embodiment. The attachment arm 206 may include a first portion (or "first end") that is continuous with the mirror housing 202 and a second end (or "second portion") that is configured to attach the side mirror to the vehicle 104. More specifically, the attachment arm 206 may connect the mirror housing 202 to the vehicle 104. In an embodiment, the attachment arm 206 may serve as a conduit through which electrical wiring and/or other components may be conveyed. The electrical wiring may provide communication between the camera 106 and one or more other components. The side mirror 102 may also include a hinge 208 disposed between and coupling the first end to the second end of the attachment arm 206. In an embodiment, the hinge 208 may include a rotational axis about which the mirror housing 202 of the side mirror 102 is rotatable between the first position (as shown in FIG. 1A) and the second position (as shown in FIG. 1B). The rotational axis of the hinge 208 may be non-vertical such that the rotation of the mirror housing 202 from the first position to the second position rotates an optical axis of the camera 106 relative to the horizon. In an embodiment, the hinge 208 may be oriented such that a top portion of the hinge 208 is angled toward the vehicle 104 and a bottom portion of the hinge 208 is angled toward the mirror housing 202. However, in an alternative embodiment, the hinge 208 may be designed to have any rotational axis so that the side mirror may rotate between the first position and the second position, as described previously.

As mentioned previously, the side mirror 102 may include a motor 210 to move the mirror housing 202 about the hinge 208 between the first position and the second position. The motor 210 may be configured to move the mirror housing 202 into one or more intermediate positions, the intermediate positions being between the first position and the second position. The motor 210 may be coupled to at least one of the vehicle 104, the mirror housing 202, the hinge 208, or any other portion of the side mirror 102. The motor 210 may be configured to rotate the side mirror about a rotational axis of the hinge 208. In an embodiment, the motor 210 may be communicatively coupled to a controller 212. The controller 212 may be included in the side mirror 102, may be a separate system of the vehicle 104 (e.g., vehicle computing device, electronic control unit, etc.), or may be remote from the side mirror 102 and the vehicle 104. The controller 212 may activate the motor 210 to move the side mirror 102 between the first position and the second position. The controller 212 may be communicatively coupled to one or more processors (described further herein below), the motor 210, the camera 106, and/or other components. In an embodiment, the side mirror 102 may also include one or more actuators 214, which may be communicatively coupled to the controller 212 and configured to pan and/or tilt the camera 106 relative to the mirror housing 202. In such an embodiment, the camera 106 may have a larger possible field of view.

Figure 3A:
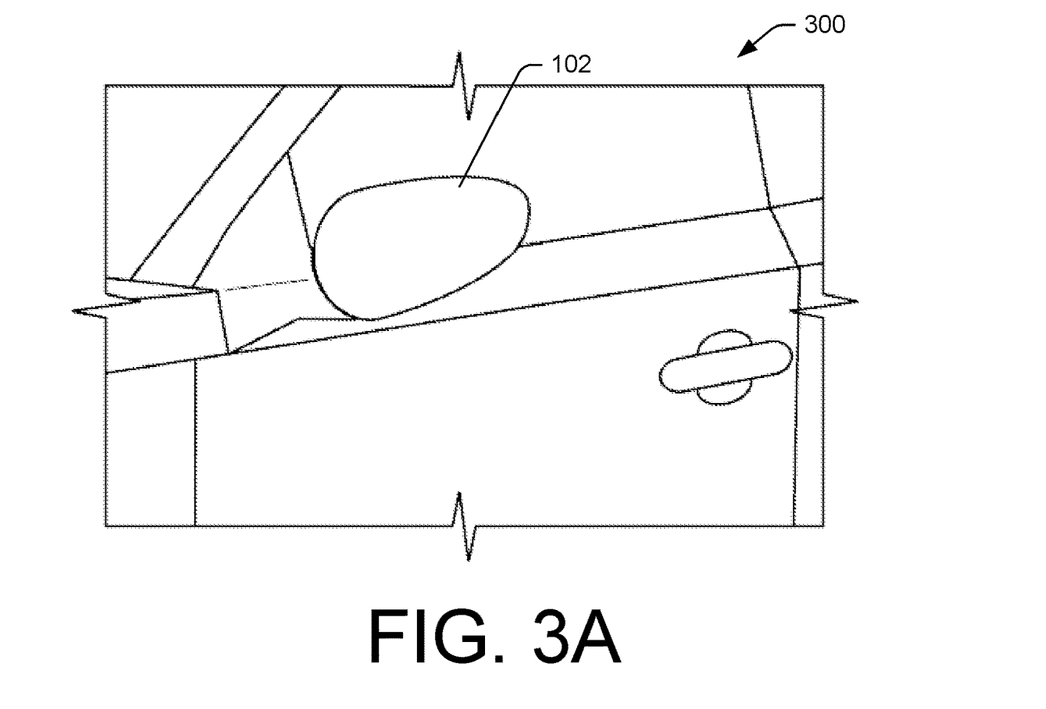
FIG. 3A illustrates an example vehicle with a side mirror in a first intermediate position.
Figure 3B:
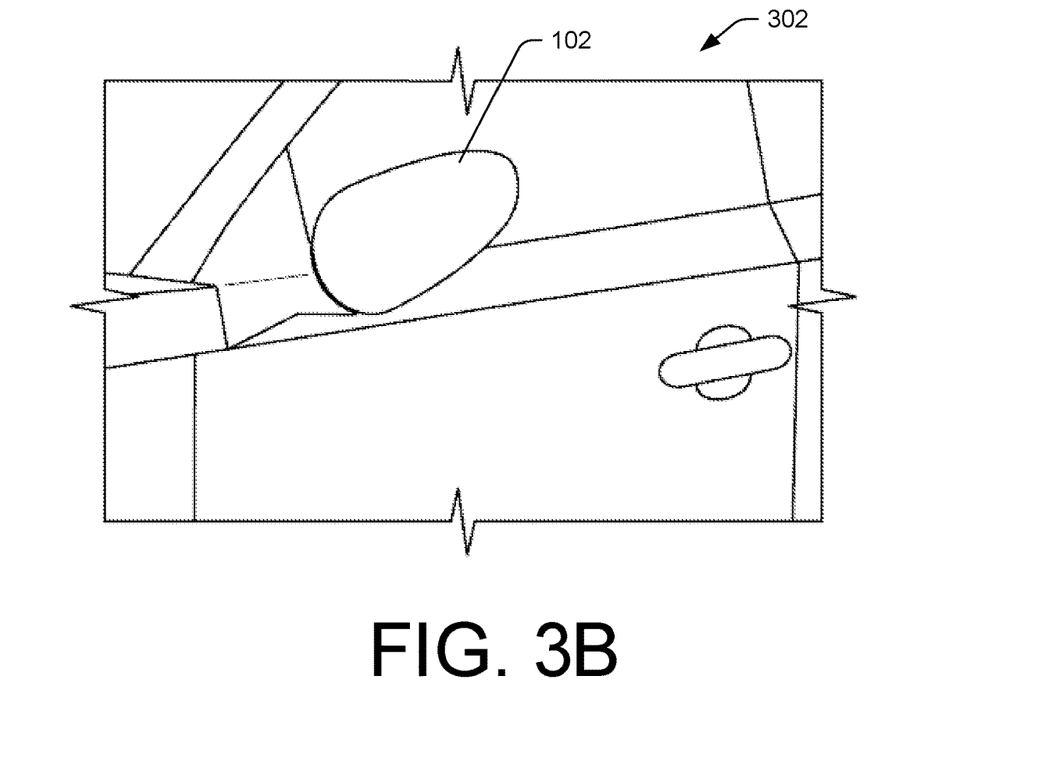
FIG. 3B illustrates the example vehicle with the side mirror in a second intermediate position.

FIGS. 3A and 3B depict the side mirror 102 in intermediate positions. For example, FIG. 3A depicts the side mirror in a first intermediate position 300 and FIG. 3B depicts the side mirror in a second intermediate position 302. As mentioned previously, the motor may be configured to move the side mirror 102 between the first position and the second position, and any intermediate positions in between. In an embodiment, the controller may activate the motor in such a way that the motor moves the camera 106 to track with an object and/or person in the field of view of the camera 106. Additionally or alternatively, the controller may instruct the one or more actuators to move the camera such that a field of view of the camera tracks with the object and/or person. For example, the field of view of the camera may move to maintain an object within the field of view of the camera. In such an example, the side mirror may move relative to the vehicle and/or the camera may move relative to the side mirror.

Figure 4A:
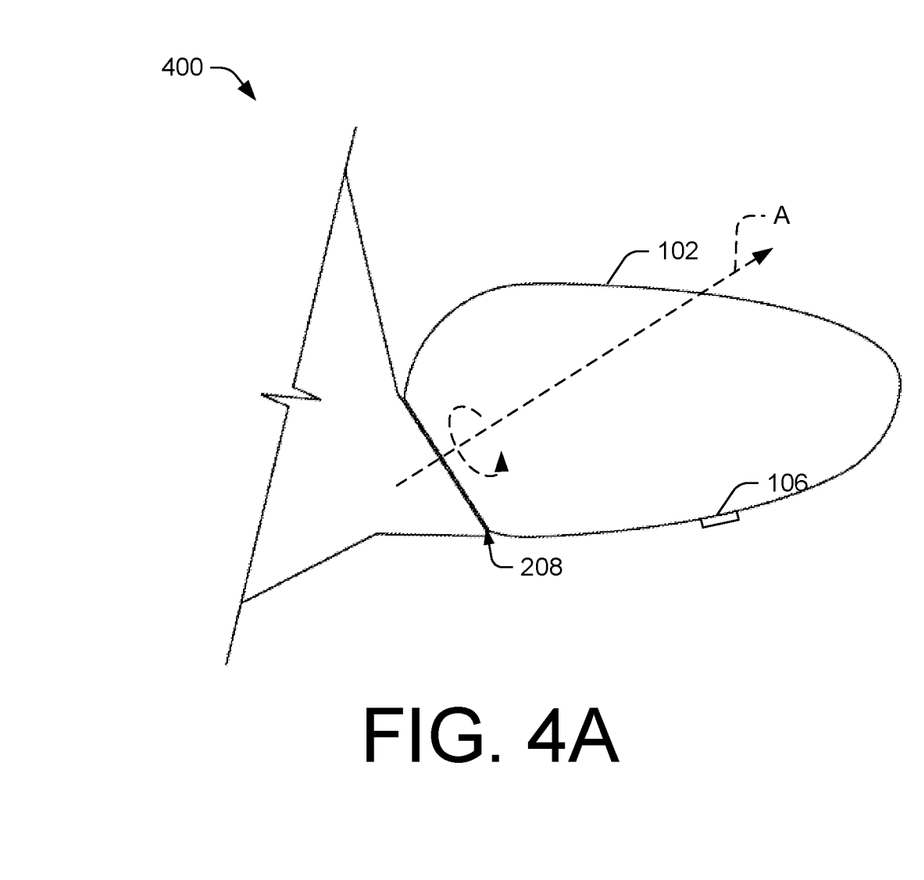
FIG. 4A illustrates an example of a hinge on which an example vehicle side mirror may rotate, FIG. 4A showing the side mirror in the first position as shown in FIG. 1A.
Figure 4B:
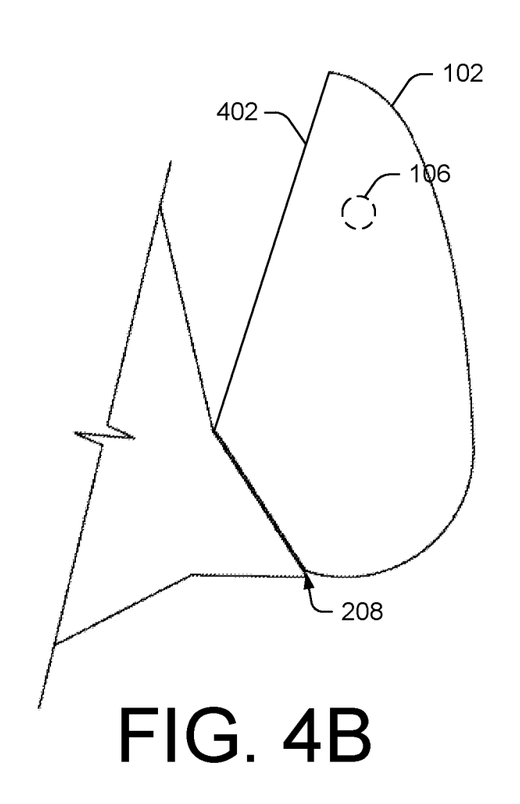
FIG. 4B illustrates an example of a hinge on which the vehicle side mirror may rotate, FIG. 4B showing the side mirror in the second position as shown in FIG. 1B.

FIG. 4A depicts an embodiment 400 of the hinge 208, as described above. It should be noted that FIGS. 4A and 4B are drawn as if looking at the side mirror from the front of the vehicle. In such an embodiment 400, the hinge 208 may be oriented at an oblique angle. For example, a top portion of the hinge 208 may be angled towards the vehicle and a bottom portion of the hinge may be angled away from the vehicle. As the side mirror 102 rotates, an optical axis of the camera 106 may move in a diagonal plane around a rotational axis shown by line A. Additionally, and/or alternatively, in an embodiment, the hinge may include multiple axes of rotation. For example, the side mirror may first rotate inward about a vertical axis of rotation and then rotate upward around a horizontal axis of rotation, and/or, vis versa. FIG. 4A depicts the side mirror in the first position, while FIG. 4B depicts the side mirror in the second position. In the view shown by FIG. 4B, the camera 106 is located on a backside of the side mirror 102 such that the camera 106 is pointed toward a rear of the vehicle (into the page). As shown in FIG. 4B, element 402 may include a reflective surface. In the position shown in FIG. 4B, the reflective surface may be facing the vehicle.

Figure 5A:
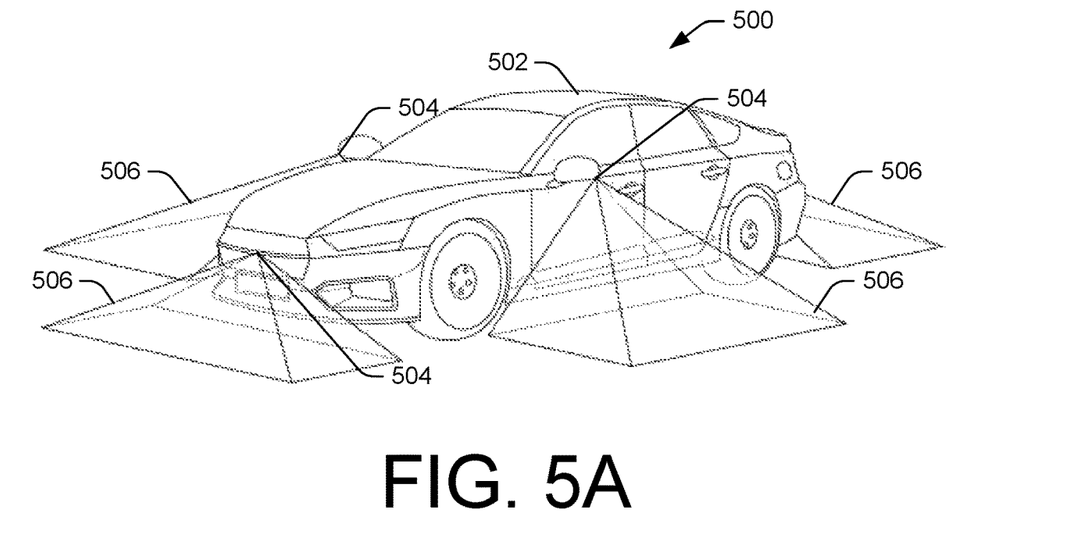
FIG. 5A illustrates an example vehicle with a system of cameras oriented in a first position such that fields of view of one or more of the cameras capture a first area proximate the vehicle.

FIG. 5A depicts a first embodiment 500 of an example vehicle 502 with a system of cameras 504 oriented in a first position such that fields of view 506 of one or more of the cameras 504 capture a first area proximate the vehicle 502. In the first embodiment 500, the multiple cameras 504 may be directed substantially downward, as shown by the field of view cones 506. The multiple cameras 504 may be directed substantially downward while the vehicle is moving, while the vehicle is occupied, etc. The multiple cameras 504 may be directed downward in order to give a driver of the vehicle 502 a complete 360 degree view of a portion of the environment surrounding the vehicle 502 that is ordinarily impossible for a driver of the vehicle 502 to see.

Figure 5B:
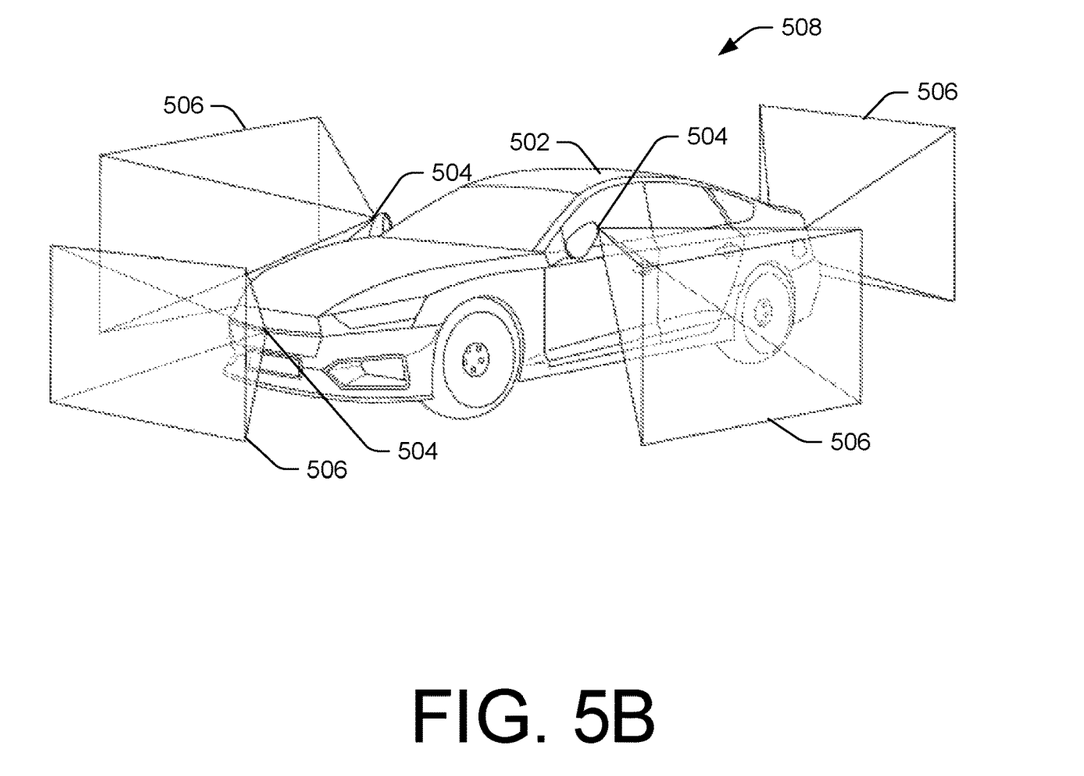
FIG. 5B illustrates the example vehicle of FIG. 4A with the system of cameras oriented in a second position such that fields of view of one or more of the cameras capture a second area, different than the first area.

FIG. 5B depicts a second embodiment 508 of field of view cones 506 for multiple cameras 504 disposed on a vehicle 502. In the second embodiment 508, the multiple cameras 504 may be rotated in order to orient the field of view cones 506 substantially outward from the vehicle instead of substantially downward (as shown in FIG. 5A). Similar to the second position described above with respect to FIG. 1B, the multiple cameras 504 may be oriented substantially outward when the vehicle is parked, when the vehicle is unoccupied, etc. In such an embodiment, the multiple cameras 504 may be used for security and/or other purposes (described further herein below with respect to FIGS. 7 and 8).

Figure 6:
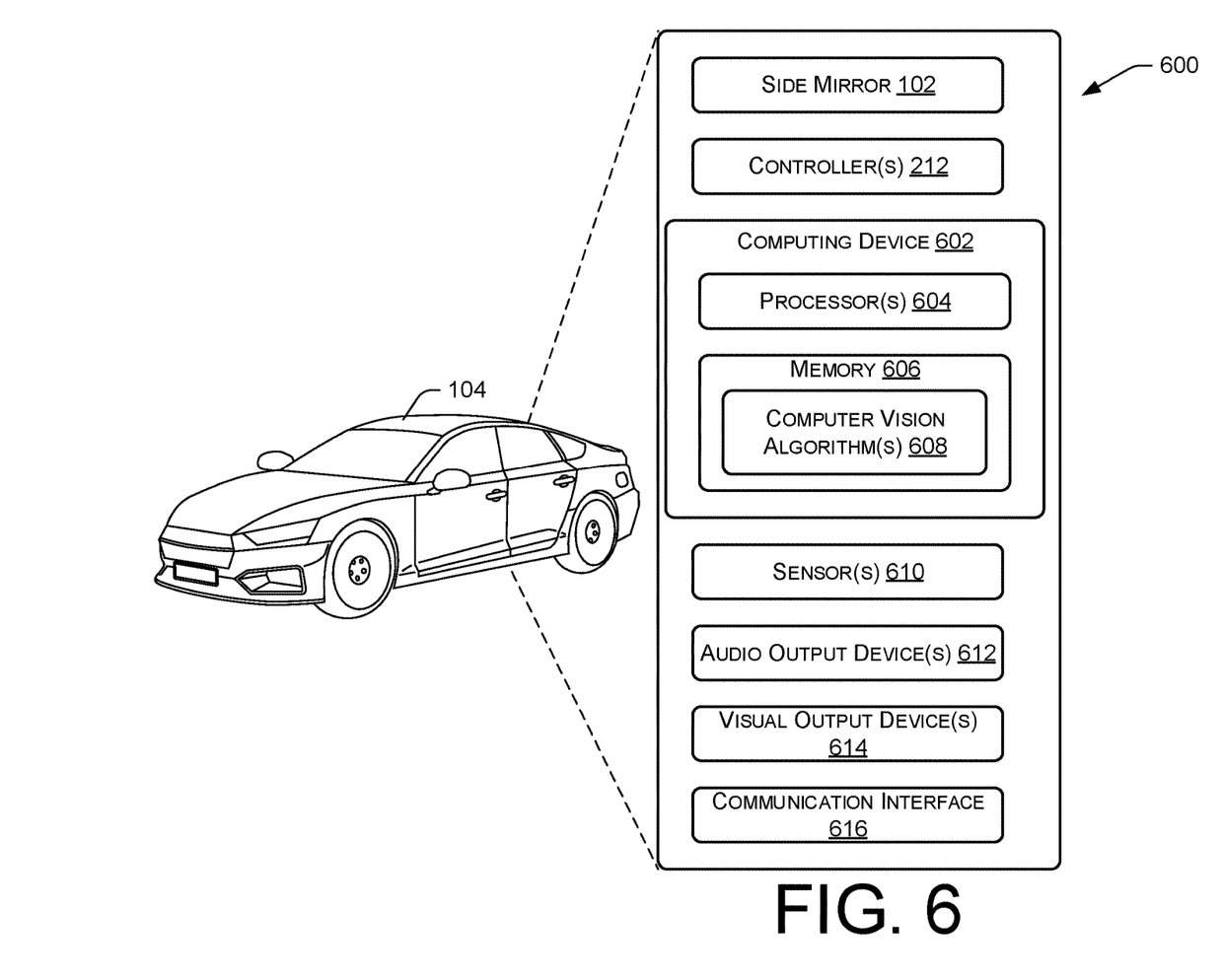
FIG. 6 is a block diagram illustrating components of an example vehicle, such as that shown in FIG. 1.

FIG. 6 depicts a block diagram illustrating components 600 of a vehicle 104, such as that shown in FIG. 1. The components 600 shown in FIG. 6 may be included as part of the vehicle 104 and may be communicatively coupled to the vehicle 104. Any one of the components 600 described in FIG. 6 may be communicatively coupled to any one or more of another component 600. As mentioned previously, the vehicle 104 may include a side mirror 102. The side mirror 102 may include the components previously described with respect to FIG. 2. One or more components of the side mirror 102 may be communicatively coupled to the controller 212.

In an embodiment, the vehicle 104 may also include a computing device 602, to which the controller 212 may be communicatively coupled. The computing device 602 may be a local computing device of the vehicle 104 or the computing device 602 may be a remote computing device connected to the vehicle 104 via a network. In an embodiment, the vehicle 104 may be communicatively coupled to a local computing device and a remote computing device that may operate in conjunction or independently. The computing device 602 includes one or more processors 604 and memory 606. The memory 606 may store multiple computer vision algorithms 608 (or "computer vision models/classifiers") which may be executed by the one or more processors 604. Such computer vision algorithms 608 may include, but are not limited to, at least one of the following: neural networks, template matching, deformable part model, support vector machine (SVM), random forest, Hidden Markov Model (HMM), etc. The vehicle 104 may also store image data captured from the camera 106 on the memory 606 of the computing device 602.

The vehicle 104 may also include one or more sensors 610. The sensors 610 may include one or more cameras, ultrasonic sensors, proximity sensors, motion sensors, displacement sensors, pressure sensors, contact sensors, microphones, and/or other sensors. The one or more sensors 610 may be used to determine that an object, person, and/or animal may be nearby the vehicle 104, contacting the vehicle 104, or attempting to gain entry into the vehicle 104. In an embodiment, sensor data captured by one or more of the sensors may cause the computing device 602 or controller 212 to trigger recording or storage of image data captured by the camera. The vehicle 104 may further include an audio output device 612 and/or a visual output device 614. The audio output device 612 and/or the visual output device 614 may be part of a vehicle security system and may be activated to alert a person that they and/or an object is contacting the vehicle 104. The vehicle 104 may further include a communication interface 616 that may be communicatively coupled to the computing device 602. The communication interface 616 may allow the computing device 602 of the vehicle 104 to send a notification and/or other alerts to an authorized user of the vehicle and/or an electronic device associated with the authorized user.

Figure 7:
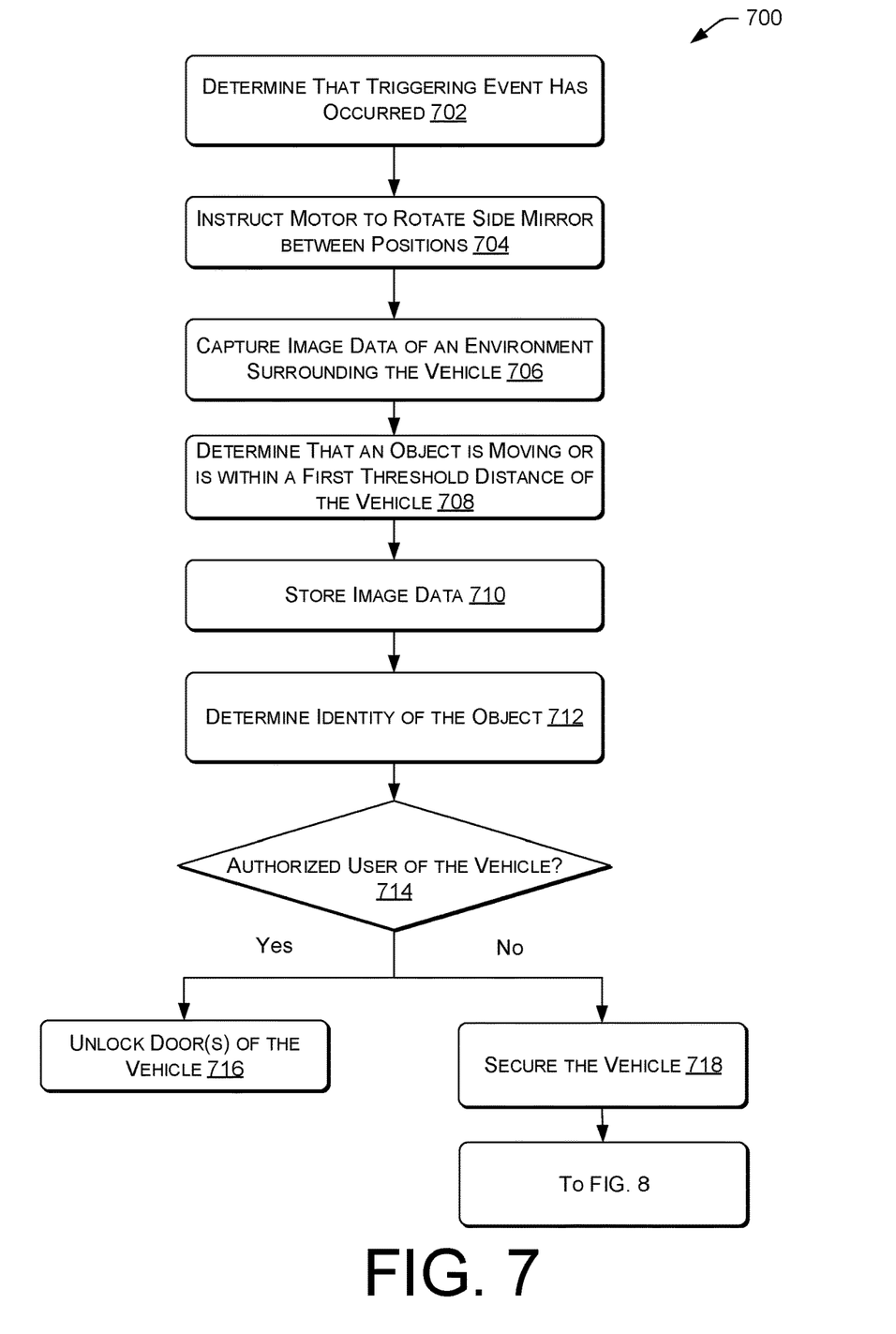
FIG. 7 is a flowchart illustrating an example process of identifying an object via a side mirror camera of a vehicle.

FIG. 7 depicts a flow diagram of an example process of identifying an object via a side mirror camera of a vehicle. For ease of explanation, the process 700 is described as being performed at least in part by the vehicle 104 and its components 700. However, in an embodiment, the process 700 may be performed by a remote service.

The example process 700 (as well as each process described herein) is illustrated as a logical flow graph, each operation of which represents a sequence of operation that can be implemented by hardware, software, or a combination thereof. In the context of software, the operations represent computer-executable instructions stored on one or more computer-readable media, that when executed by one or more processors, perform the recited operation. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMS, EEPROMS, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, unless otherwise noted, the order in which the operations are described is not intended to be construed as a limitation, and any number of the described operations can be combined in any order and/or in parallel to implement the process.

At 702, a computing device and/or a controller determines that a triggering event has occurred. In an embodiment, the triggering event may include any one of the following: all occupants have exited the vehicle, the vehicle has been shifted into park, the vehicle has been stationary and/or unoccupied for a predetermined amount of time, one or more sensors determine the presence of an unknown object or person, etc.

At 704, the controller may instruct a motor to move a side mirror between a first position (as described in FIG. 1A) and a second position (as described in FIG. 1B). In an embodiment, the controller may instruct the motor to rotate the side mirror between the first position and the second position based at least in part on determining that the triggering even has occurred. For example, a driver may exit a vehicle and lock a door of the vehicle, upon which, the controller may instruct the motor to move the side mirror from the first position to the second position.

At 706, the camera begins capturing image data of an environment surrounding the vehicle. At this step 706 in the process 700, the camera may capture image data at a relatively low frame rate so as to save power consumption while still monitoring the environment around the vehicle. For example, the camera may capture images only periodically or at a low frame rate, low resolution, etc.

At 708, the computing device determines, from the image data captured by the camera, that an object is proximate the vehicle. When used herein, the term object may include a person, object, or animal That is, the computing device determines from the image data that a person, object, or animal is within a first threshold distance of the vehicle. Additionally or alternatively, in an embodiment, the computing device may determine that an object is proximate the vehicle based on the one or more other sensors instead of or in addition to the image data. Furthermore, in an embodiment, the computing device may determine from the image that an object is moving.

At 710, the computing device stores image data captured by the camera. In an embodiment, the computing device may begin storing image data based at least in part on determining that a person, object, or animal is within a threshold distance of the vehicle. Additionally, and/or alternatively, the camera may begin capturing image data at an increased frame rate, increased resolution, etc. This alleviates the need for image data to constantly be storing data that is captured by the camera. Once it is determined that an object is within the threshold distance of the vehicle, an alert may be sent to an owner and/or an authorized user of the vehicle via an electronic device associated with the owner and/or the authorized user that the object is within the threshold distance of the vehicle.

At 712, the computing device determines from the image data an identity of the object. For example, the computing device may run one or more algorithms to determine what kind of object is proximate the vehicle. In an embodiment, if the computing device determines that a person is within the threshold distance of the vehicle, the computing device may attempt to determine an identity of the person.

At 714, the computing device may determine whether the person is an authorized user of the vehicle. In an embodiment, the computing device may use computer vision algorithms to identify one or more biometric characteristics of an authorized user of the vehicle. Additionally, and/or alternatively, an authorized user may present a token in a field of view of the camera in order for the computing device to verify whether the token is associated with the authorized user. If, at 714—Yes, the computing device is able to determine the identity of the person and the person is an authorized user of the vehicle, the process may proceed to step 716. However, if, at 714—No, the computing device is unable to identify the person and/or the person is an unauthorized user of the vehicle, the process may proceed to step 718.

At 716, the computing device may instruct the vehicle to unlock a door of the vehicle based at least in part on determining that the person is an authorized user of the vehicle.

At 718, the computing device may ensure that the vehicle is secured (i.e., doors and windows are shut and locked) based at least in part on determining that the person is an unauthorized user of the vehicle.

Figure 8:
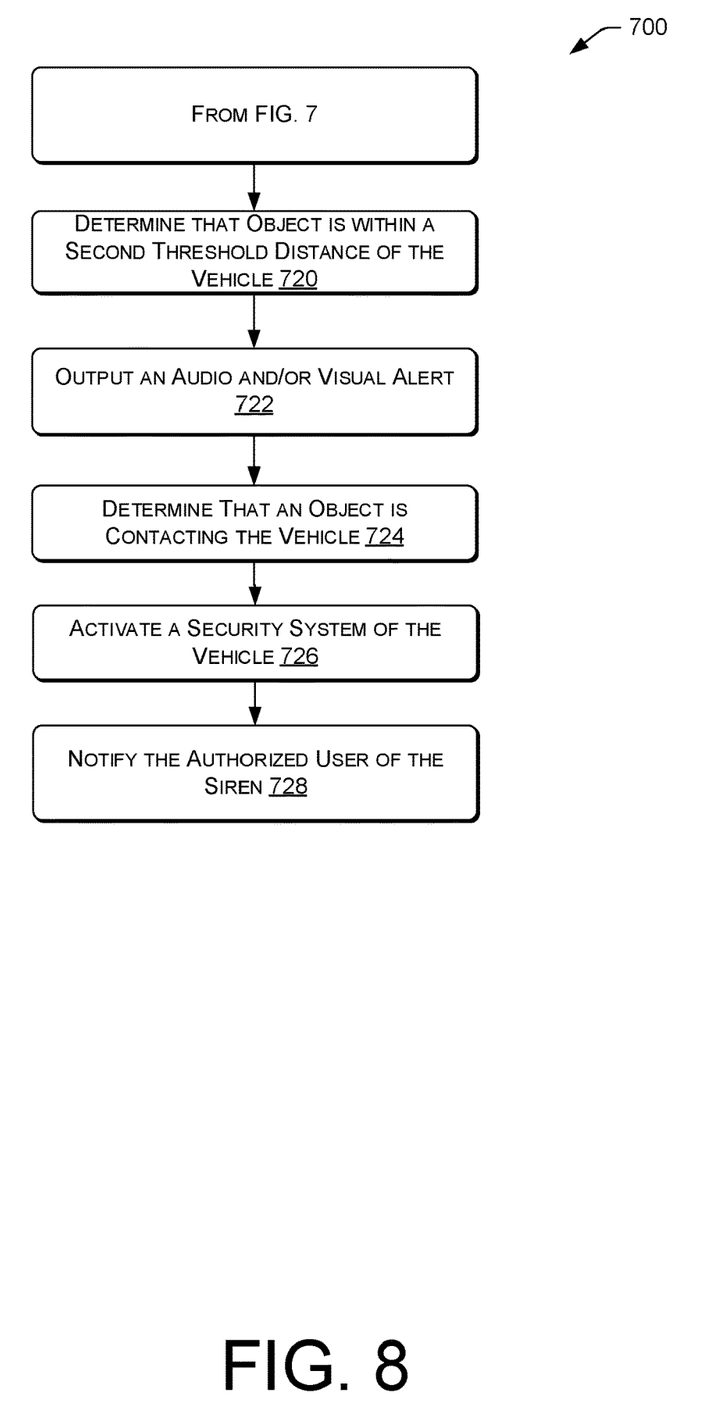
FIG. 8 is a continuation of the example process of FIG. 7.

FIG. 8 depicts a continuation of process 700 as shown in FIG. 7. At 720, the computing device may determine, via the image data or one or more other sensors, whether the person, or other object, is within a second threshold distance of the vehicle. In process 700 the second threshold distance is less than the first threshold distance.

At 722, the computing device may cause an audio output device and/or a visual output device to output an alert to the object that the object is within the second threshold distance of the vehicle. For example, the vehicle may output a short, relatively lower volume, sound to warn a person that they are getting close to the vehicle. In an embodiment, step 722 may be omitted.

At 724, the computing device may determine, via one or more sensors, whether the person is contacting the vehicle. In an embodiment, the computing device may determine whether the person (or object) is deliberately contacting the vehicle, causing damage to the vehicle, the person is trying to gain entry into the vehicle, etc.

At 726, the computing device may activate a security system of the vehicle based at least in part on determining that the person is an unauthorized user of the vehicle and the person is contacting the vehicle. For example, the computing system may activate a siren in response to determining that the person is an unauthorized user of the vehicle and that the person is contacting the vehicle. In an embodiment, if the person and/or object discontinues contacting the vehicle, the siren may automatically cease. However, the siren may continue to sound until the person and/or object is past the first threshold distance of the vehicle.

At 728, the computing device may send a notification to an electronic device associated with the authorized user of the vehicle, notifying the authorized user that the person and/or object is contacting the vehicle. In an embodiment, the notification may include at least a portion of the image data of the person and/or object, a selectable control to silence the alarm, a selectable control to call a security service or law enforcement, and/or a selectable control to activate an intercom system on the vehicle.

Conclusion

While various examples and embodiments are described individually herein, the examples and embodiments may be combined, rearranged and modified to arrive at other variations within the scope of this disclosure.

Although embodiments have been described in language specific to structural features and/or methodological acts, it is to be understood that the disclosure is not necessarily limited to the specific features or acts described. Rather, the specific features and acts are disclosed herein as illustrative forms of implementing the claimed subject matter. Each claim of this document constitutes a separate embodiment, and embodiments that combine different claims and/or different embodiments are within the scope of the disclosure and will be apparent to those of ordinary skill in the art after reviewing this disclosure.

What is claimed is:

1. A vehicle comprising:
   a side mirror including a camera disposed on the side mirror;
   a visual output device including a display;
   one or more processors; and
   one or more non-transitory computer-readable media storing instructions that, when executed, cause the vehicle to perform operations including:
   receiving, from the camera, image data;
   determining, based at least in part on the image data, that an unauthorized user is within a first threshold distance of the vehicle;
   causing output of a first alert to indicate that the unauthorized user is within the first threshold distance of the vehicle;
   determining, based at least in part on the image data, that the unauthorized user is within a second threshold distance of the vehicle, the second threshold distance being less than the first threshold distance;
   causing, based at least in part on determining that the unauthorized user is within the second threshold distance, output of a second alert to indicate that the unauthorized user is within the second threshold distance, the second alert being different than the first alert and including a visual alert output on the visual output device of the vehicle indicating that the unauthorized user is within the second threshold distance;
   determining, based at least in part on the image data, that the unauthorized user is within a third threshold distance of the vehicle, the third threshold distance being less than the second threshold distance, wherein the unauthorized user is contacting the vehicle; and
   causing output of a third alert via at least one of an audio output device or the visual output device of the vehicle in response to determining that the unauthorized user is within the third threshold distance, the third alert being different than the first and second alerts, including at least one of a different sound, audio notification, or a different visual output.

2. The vehicle according to claim 1, wherein the operations further include:
   determining, based at least in part on the image data and after causing output of the second alert, that the unauthorized user is outside of the first threshold distance of the vehicle; and
   ceasing output of the second alert based on determining that the unauthorized user is outside of the first threshold distance.

3. The vehicle according to claim 1, wherein the first alert includes an audio alert.

4. The vehicle according to claim 1, wherein the operations further include:
   sending a first notification to an electronic device associated with an authorized user of the vehicle based at least in part on determining that the unauthorized user is within the first threshold distance, the first notification indicating that the unauthorized user is within the first threshold distance.

5. The vehicle according to claim 1, wherein the operations further include:
   sending a second notification to an electronic device associated with an authorized user of the vehicle based at least in part on determining that the unauthorized user is within the second threshold distance, the second notification indicating that the unauthorized user is within the second threshold distance.

6. The vehicle according to claim 5, wherein the second notification includes at least a portion of the image data depicting the unauthorized user, a first selectable control to cease output of the second alert, or a second selectable control to activate an intercom system on the vehicle.

7. The vehicle according to claim 1, wherein the operations further include:
   storing the image data based at least in part on determining that the unauthorized user is within the first threshold distance of the vehicle.

8. The vehicle according to claim 1, further comprising:
   a body;
   an actuator coupled to the camera and configured to move the camera independent from and relative to the side mirror;
   a hinge coupling the side mirror to the body, the hinge having a rotational axis about which the side mirror is rotatable relative to the body;
   a motor coupled to at least one of the body, the side mirror, or the hinge and configured to rotate the side mirror about the rotational axis between:
      a first position in which a field of view of the camera is directed in a first direction; and
      a second position in which the field of view of the camera is directed in a second direction, different than the first direction; and
   a controller, including one or more processors, communicatively coupled to the motor, the controller configured to rotate the side mirror from the first position to the second position at least partly in response to the vehicle being parked.

9. The vehicle according to claim 1, wherein the operations further include:
   determining, based at least in part on the image data, that the unauthorized user is contacting the vehicle; and
   at least one of:
      sending a notification to a device associated with an authorized user of the vehicle, the notification indicating that the unauthorized user is contacting the vehicle; or
      causing output of a third alert via at least one of an audio output device or the visual output device of the vehicle.

10. A method comprising:
    determining that a vehicle is parked;
    capturing, via a camera located on the vehicle and based at least in part on determining that the vehicle is parked, image data;
    determining, from the image data, that an object or an unauthorized user is moving or is within a first threshold distance of the vehicle;
    storing the image data captured by the camera based at least in part on determining that the object or unauthorized user is moving or is within the first threshold distance of the vehicle;
    causing performance of a first action based at least in part on determining that the object or the unauthorized user is moving or is within the first threshold distance of the vehicle;
    determining, from the image data, that the object or the unauthorized user is within a second threshold distance of the vehicle, the second threshold distance being less than the first threshold distance;
    causing performance of a second action based at least in part on the object or the unauthorized user being within the second threshold distance, the second action being different than the first action;

determining, based at least in part on the image data, that the unauthorized user is within a third threshold distance of the vehicle, the third threshold distance being less than the second threshold distance, wherein the unauthorized user is contacting the vehicle; and causing performance of a third action in response to determining that the unauthorized user is within the third threshold distance, the third action being different than the first and second actions, including at least one of a different sound, audio notification, or a different visual output.

11. The method according to claim 10, wherein the camera is located on a side mirror of the vehicle and the method further comprises:

rotating, based at least in part on determining that the vehicle is parked, the side mirror of the vehicle:

a first position in which a field of view of the camera is directed at a first angle, and a second position in which the field of view of the camera is directed at a second angle, different than the first angle, wherein the image data is captured while the side mirror is in the second position.

12. The method according to claim 10, further comprising:

transmitting an alert to an electronic device associated with an authorized user of the vehicle that that the object or the unauthorized user is moving or is within the first threshold distance of the vehicle.

13. The method according to claim 10, further comprising:

determining, from the image data, that a second object represented in the image data is moving or is within the first threshold distance of the vehicle;

determining from the image data that the second object represented in the image data is an authorized user of the vehicle; and unlocking a door of the vehicle based at least in part on determining that the second object is the authorized user of the vehicle.

14. The method according to claim 10, further comprising:

determining from the image data, after causing performance of the second action that the object or the unauthorized user is outside of the first threshold distance; and ceasing output of the second type of alert performance of the second action based at least in part on the object being outside of the first second threshold distance.

15. The method according to claim 10, wherein causing performance of the first action includes causing output of a first alert including a first type of alert, the first type of alert including an audio alert having a first volume.

16. The method according to claim 15, wherein causing performance of the second action includes causing output of a second alert including a second type of alert, the second type of alert including an audio alert having a second volume that is greater than the first volume.

17. A vehicle comprising:
one or more sensors;
a side mirror including a camera disposed on the side mirror;
a visual output device including a display;
one or more processors; and
one or more non-transitory computer-readable media storing instructions that, when executed, cause the vehicle to perform operations including:
receiving, from the camera, image data;
receiving, from the one or more sensors, sensor data;
determining, based at least in part on the image data or the sensor data, that an object is within a first threshold distance of the vehicle;
determining that the object is an unauthorized user of the vehicle;
causing performance of a first action based at least in part on determining that the object is within the first threshold distance and determining that the object is the unauthorized user of the vehicle;
determining, based at least in part on the image data or the sensor data, that the object is within a second threshold distance of the vehicle, the second threshold distance being less than the first threshold distance;
causing, based at least in part on determining that the unauthorized user is within the second threshold distance, performance of a second action, the second action including a visual alert output on the visual output device of the vehicle indicating that the unauthorized user is within the second threshold distance, the second action being different than the first action;
determining, based at least in part on the image data, that the unauthorized user is within a third threshold distance of the vehicle, the third threshold distance being less than the second threshold distance, wherein the unauthorized user is contacting the vehicle; and
causing output of a third action via at least one of an audio output device or the visual output device of the vehicle in response to determining that the unauthorized user is within the third threshold distance, the third action being different than the first and second actions, including at least one of a different sound, audio notification, or a different visual output.

18. The vehicle according to claim 17, wherein causing performance of the first action includes causing output of a first alert indicating that the object is within the first threshold distance of the vehicle and that the object is an unauthorized user of the vehicle, and causing performance of the second action includes causing output of a second alert indicating that the unauthorized user is within the second threshold distance.

19. The vehicle according to claim 17, wherein the operations further include:

sending an alert to an electronic device associated with an authorized user of the vehicle, the alert indicating that the object is contacting the vehicle.

20. The vehicle according to claim 17, wherein the operations further include:

determining, based at least in part on the image data or the sensor data, that a second object is within a first threshold distance of the vehicle;

determining, from the image data, that the second object is an authorized user of the vehicle; and unlocking a door of the vehicle based at least in part on determining that the second object is the authorized user of the vehicle.

* * * * *